United States Patent [19]
Someno et al.

[11] Patent Number: 5,982,547
[45] Date of Patent: Nov. 9, 1999

[54] OPTICAL FILTER

[75] Inventors: Yoshihiro Someno, Miyagi-ken; Koichi Kamiyama, Fukushima-ken, both of Japan

[73] Assignee: Alps Electric Co., Ltd., Tokyo, Japan

[21] Appl. No.: 09/014,835

[22] Filed: Jan. 28, 1998

[30] Foreign Application Priority Data

Jan. 29, 1997 [JP] Japan .................................. 9-015490

[51] Int. Cl.⁶ ....................................................... G02B 5/30
[52] U.S. Cl. ............................................. 359/585; 359/588
[58] Field of Search ............................. 359/580, 585, 359/588, 360

[56] References Cited

U.S. PATENT DOCUMENTS

| | | | |
|---|---|---|---|
| 4,322,130 | 3/1982 | Ito et al. | 359/585 |
| 4,381,883 | 5/1983 | Yamamoto et al. | 359/588 |
| 4,488,775 | 12/1984 | Yamamoto | 359/588 |
| 5,140,457 | 8/1992 | Letter | 359/360 |
| 5,183,700 | 2/1993 | Austin | 359/360 |
| 5,216,551 | 6/1993 | Fujii | 359/585 |
| 5,521,759 | 5/1996 | Dobrowolski et al. | 359/585 |
| 5,541,770 | 7/1996 | Pellicori et al. | 359/585 |
| 5,834,103 | 11/1998 | Bond et al. | 359/585 |
| 5,837,361 | 11/1998 | Glaser et al. | 359/585 |

FOREIGN PATENT DOCUMENTS

| | | | |
|---|---|---|---|
| 0057001 | 5/1981 | Japan | 359/585 |
| 401128829 | 5/1989 | Japan | B23B 7/02 |
| 2-47722 | 10/1990 | Japan | G02B 5/28 |
| WO 94/19709 | 9/1994 | WIPO | 359/585 |

*Primary Examiner*—Cassandra Spyrou
*Assistant Examiner*—John Juba, Jr.
*Attorney, Agent, or Firm*—Brinks Hofer Gilson & Lione

[57] ABSTRACT

An optical filter, which has a predetermined transmittance and a low reflectance at a wavelength λ of, for example, 780 nm, comprises a metal film and a dielectric thin-film deposited adjacent to the metal film, the dielectric thin-film having a refractive index lower than that of the metal film and a thickness of λ/40 or less. Also disclosed is an optical filter, comprising a substrate, a plurality of sets of dielectric thin-films (H) with a high refractive index and dielectric thin-films (L) with a low refractive index, and a metal layer. The dielectric thin-films (H) and the dielectric thin-films (L) are alternately deposited on the substrate and the metal film is provided between one dielectric thin-film (H) and the adjacent dielectric thin-film(L). The dielectric thin-film (L) adjacent to the metal film has a thickness λ/40 or less.

2 Claims, 6 Drawing Sheets

THICKNESS (nm)

OPTICAL FILTER

BACKGROUND OF THE INVENTION

1. Field of the Invention

The present invention relates to an optical filter which absorbs a part of optical signals passing through an optical path and restricts the intensity of transmitted light, and more particularly relates to a configuration of a multilayered optical filter for decreasing a reflectance.

2. Description of the Related Art

Generally, an optimization of a configuration of a multilayer film composing an optical filter can restrict the intensity of transmitted light by absorbing a part of optical signals and thus an optical filter having a predetermined transmittance is obtainable. FIG. 4A shows a configuration of a conventional multilayered optical filter, and FIG. 4B shows a thickness and a refractive index of each layer in the configuration shown in FIG. 4A. The optical filter includes $TiO_2$ layers having a relatively high refractive index ($n \approx 2.5$) and $SiO_2$ layers having a relatively low refractive index ($n \approx 1.45$), in a thickness of $\lambda/5$ to $\lambda/10$, alternately deposited several times between a substrate 1$a$ and a substrate 1$b$, and also includes a metal film 2 having a lower refractive index ($n \approx 0.95$) and a thickness of several to several ten nanometers deposited between two adjacent $SiO_2$ layers, for the purpose of achieving a transmittance of 30% to 40% for light of $\lambda=780$ nm passing through a typical optical path.

FIG. 5 shows a reflectance R of the optical filter shown in FIG. 4A at a wavelength $\lambda$ and FIG. 6 shows a transmittance T against the same. As shown in FIG. 5, although the reflectance R reaches a minimum of approximately 15% when the wavelength $\lambda$ is nearly equal to 730 nm, it increases at a given wavelength $\lambda$ of 780 nm. Also, as shown in FIG. 6, although the transmittance reaches a maximum of approximately 35% when a wavelength $\lambda$ is nearly equal to 720 nm, it slightly decreases at a given wavelength $\lambda$ of 780 nm.

In such an optical filter, when the reflectance increases, the reflected light adversely affects signal light. As mentioned above, the conventional optical filter has a minimum reflectance R of approximately 15% and cannot achieve a low reflectance, for example, 3% or less.

SUMMARY OF THE INVENTION

It is an object of this invention to provide an optical filter having a predetermined transmittance and a low reflectance at, for example, a wavelength $\lambda$ of 780 nm.

An optical filter, in accordance with this invention, which absorbs a part of optical signals with a wavelength $\lambda$ and restricts the intensity of the transmitted light, comprises a metal film and a dielectric thin-film deposited adjacent to the metal film, the dielectric thin-film having a refractive index lower than that of the metal film and a thickness of $\lambda/40$ or less.

Also provided in accordance with the present invention is an optical filter, which absorbs a part of optical signals with a wavelength $\lambda$ and restricts the intensity of transmitted light, comprising a substrate, plural sets of dielectric thin-films (H) with a high refractive index and dielectric thin-films (L) with a low refractive index, and a metal layer. The dielectric thin-film (H) and the dielectric thin-film (L) are alternately deposited on the substrate, and the metal film is provided between one dielectric thin-film (H) and the adjacent dielectric thin-film (L). The dielectric thin-film (L) adjacent to the metal film has a thickness $\lambda/40$ or less. The dielectric thin-film (H) comprises $TiO_2$, the dielectric thin-film (L) comprises $SiO_2$, and the metal film comprises Al.

DESCRIPTION OF THE PREFERRED EMBODIMENTS

In the present invention, with regard to a metal film and a relationship between the thickness and the reflectance of a dielectric thin-film deposited onto the metal film, the transmittance and reflectance were measured while changing the thickness of the dielectric thin-film adjacent to the metal film. It has been found that the transmittance has little change and the reflectance decreases as the dielectric thin-film becomes thinner. As a result of this measurement, in the present invention, a dielectric thin-film, which has a thickness of $\lambda/40$ or less and a refractive index lower than that of the metal film, is deposited adjacent to the metal film.

An optical filter, in accordance with this invention, which absorbs a part of optical signals with a wavelength $\lambda$ and restricts the intensity of the transmitted light, comprises a metal film and a dielectric thin-film deposited adjacent to the metal film, the dielectric thin-film having a refractive index lower than that of the metal film and a thickness of $\lambda/40$ or less.

The optical filter having such a configuration enables a predetermined transmittance at a wavelength $\lambda$, for example, 780 nm, and at the same time enables a low reflectance, for example, 3% or less, which has not been achieved by any conventional configuration.

For example, Al may be used as the metal film and $SiO_2$ may be used as the dielectric thin-film.

Figure 1A:
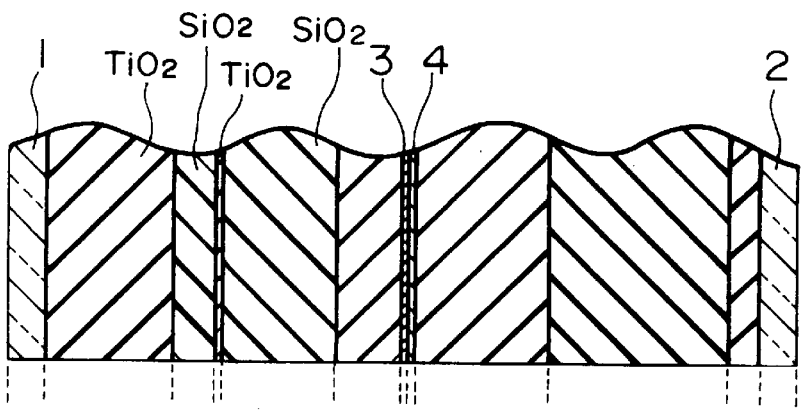
FIG. 1A shows a multilayered configuration of an optical filter.
Figure 1B:
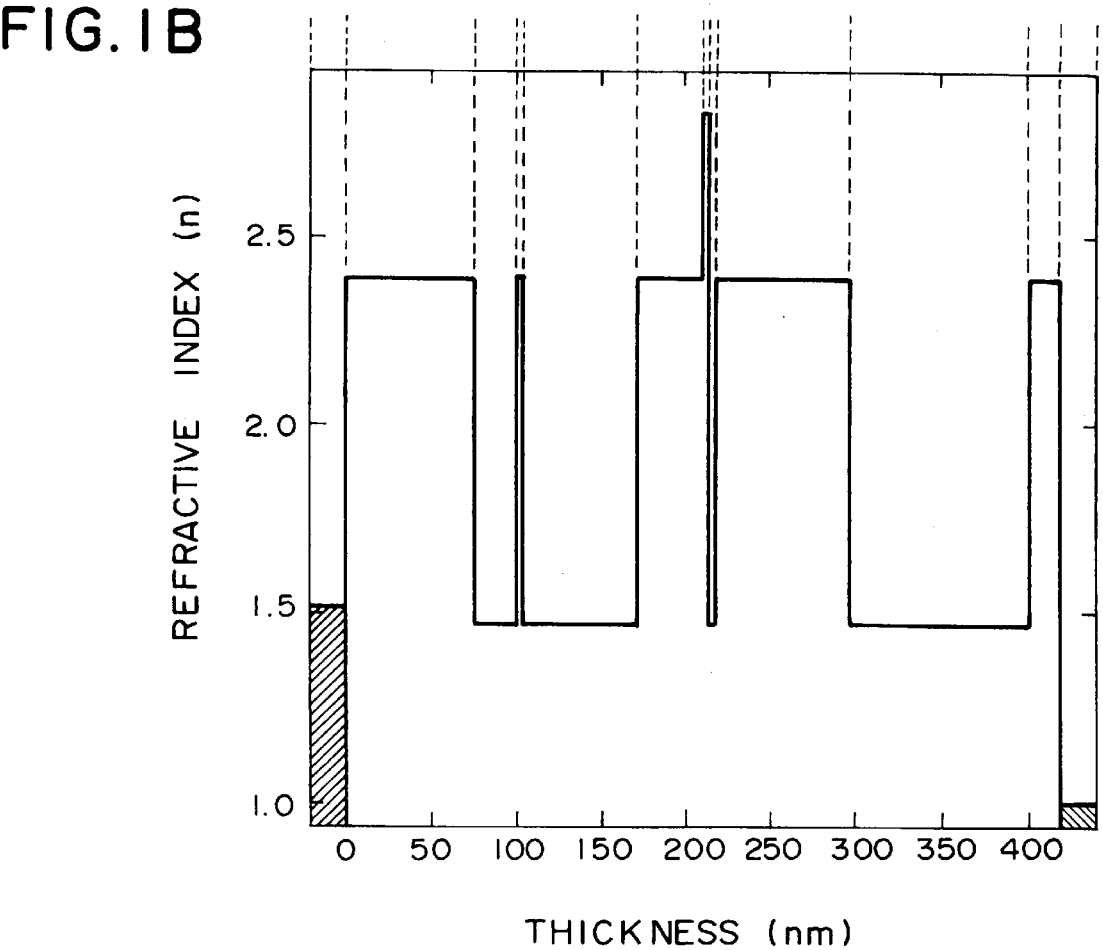
FIG. 1B shows a thickness and a refractive index of each layer of the optical filter shown in FIG. 1A as an embodiment of this invention.

Referring to the drawings, as an embodiment of the present invention, FIG. 1A shows a multilayered configuration of an optical filter and FIG. 1B shows a thickness and a refractive index of each layer of the optical filter shown in FIG. 1A. A substrate 1 is composed of a glass having a refractive index ($n \approx 1.5$) and a substrate 2 is composed of a glass having a refractive index ($n \approx 1.0$). On the substrate 1, first to fifth $TiO_2$ layers with a relatively high refractive index ($n \approx 2.5$), first to fifth $SiO_2$ layers with a relatively low refractive index ($n \approx 1.45$) and an Al layer 3 with a higher refractive index ($n \approx 2.8$) are deposited in the following order, by a sputtering process or the like, and the glass substrate 2 is deposited on the fifth $TiO_2$ layer.

First $TiO_2$ layer: t≈75 nm

First $SiO_2$ layer: t≈25 nm

Second TiO$_2$ layer: t≈several nanometers
Second SiO$_2$ layer: t≈70 nm
Third TiO$_2$ layer: t≈50 nm
Al layer 3: t≈20 nm
Third SiO$_2$ layer 4: t≈less than λ/40 nm
Fourth TiO$_2$ layer: t≈75 nm
Fourth SiO$_2$ layer: t≈100 nm
Fifth TiO$_2$ layer: t≈50 nm That is, a plurality of dielectric thin-films (H) with a high refractive index and dielectric thin-films (L) with a low refractive index, are alternately provided between the substrates, and a metal film, having a larger refractive index than that of the dielectric thin-film (L), is provided between one dielectric thin-film (H) and the adjacent dielectric thin-film (L) which corresponds to the third SiO$_2$ layer 4.

Figure 2:
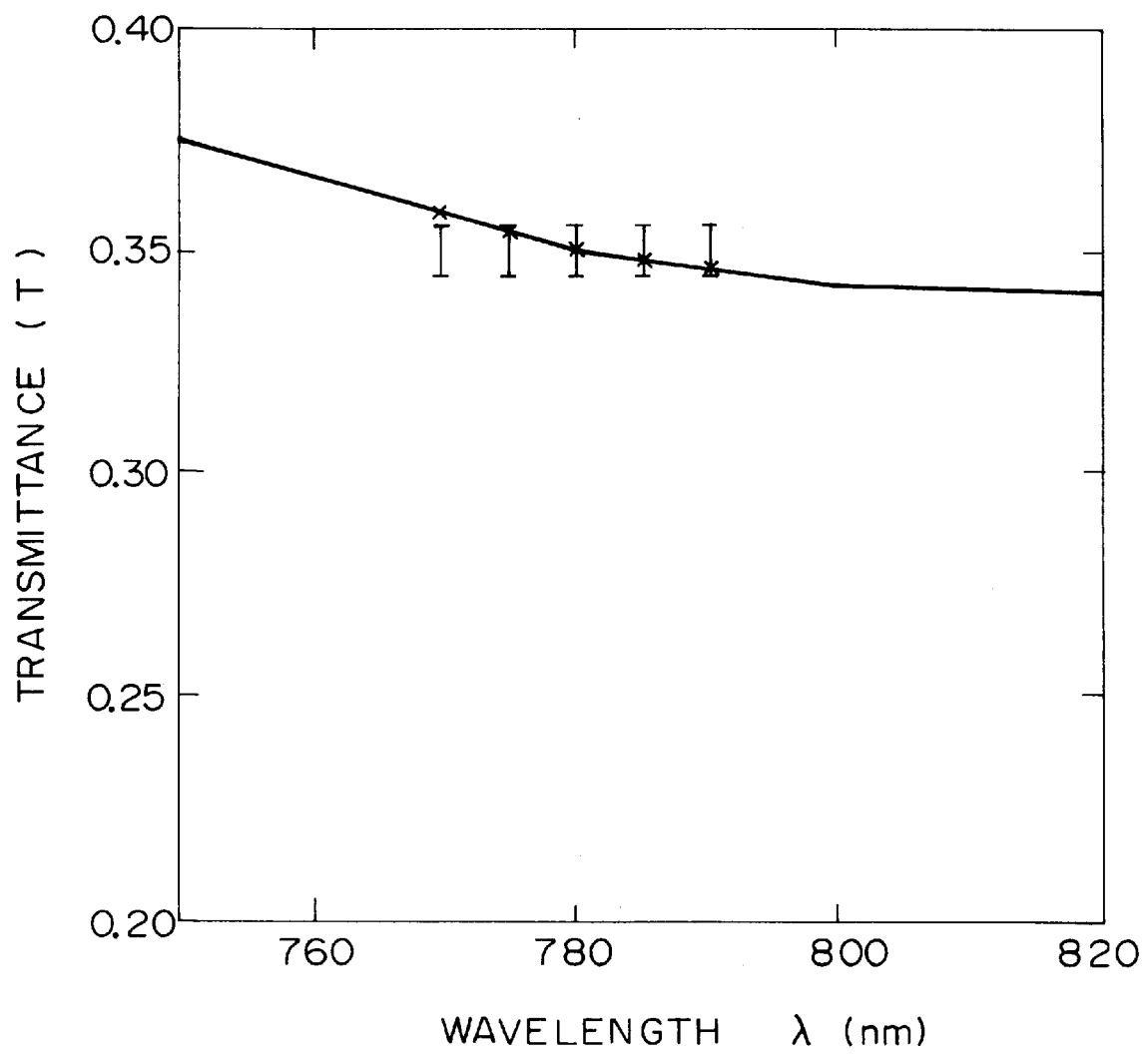
FIG. 2 is a graph which shows transmittance characteristics of the optical filter shown in FIG. 1A.

In the optical filter having the above-mentioned configuration, the transmittance T is observed while changing a wavelength λ. Referring to FIG. 2, as a wavelength λ is increased within a range of the range of 760 nm≦λ≦820 nm, the transmittance T gradually decreases from 37% to 34%, and a transmittance of 35% can be achieved at a wavelength λ of 780 nm.

Figure 3:
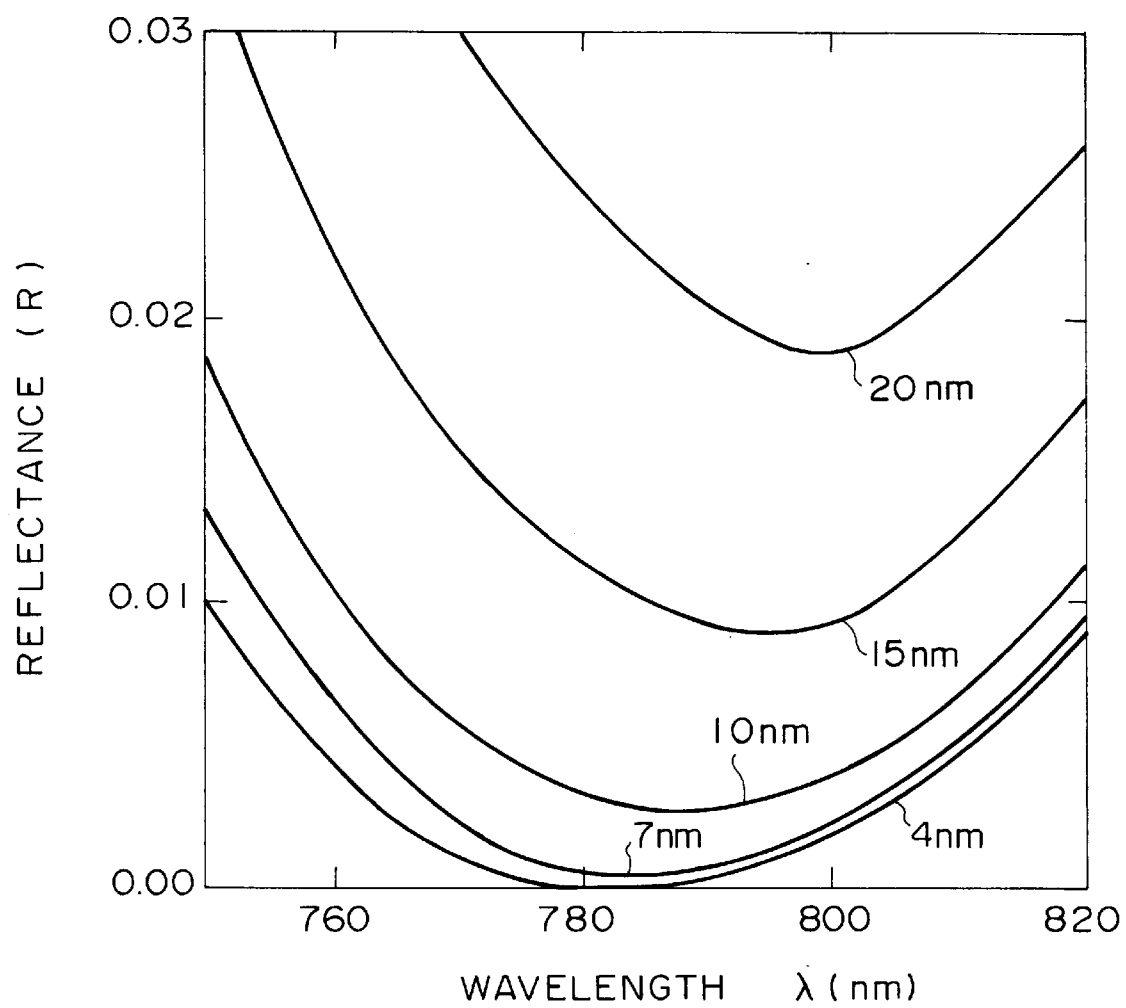
FIG. 3 is a graph which shows reflectance characteristics of the optical filter shown in FIG. 1A.
Figure 4A:
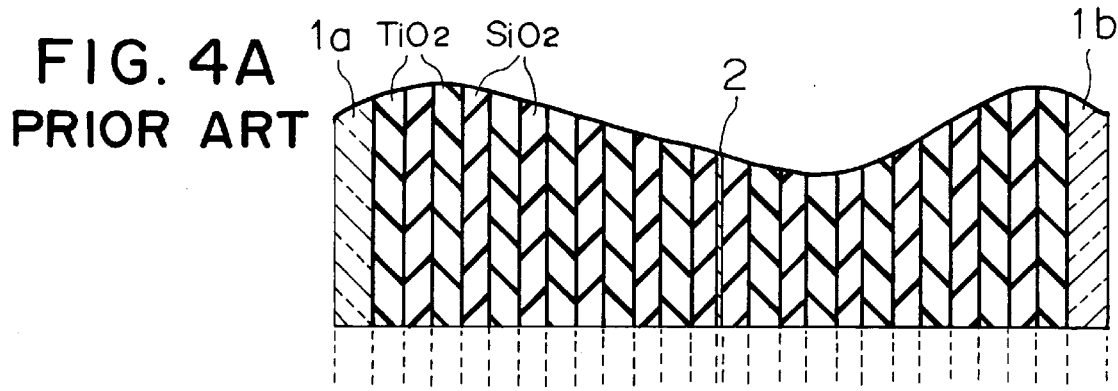
FIG. 4A shows a configuration of a conventional multilayered optical filter of the prior art.
Figure 4B:
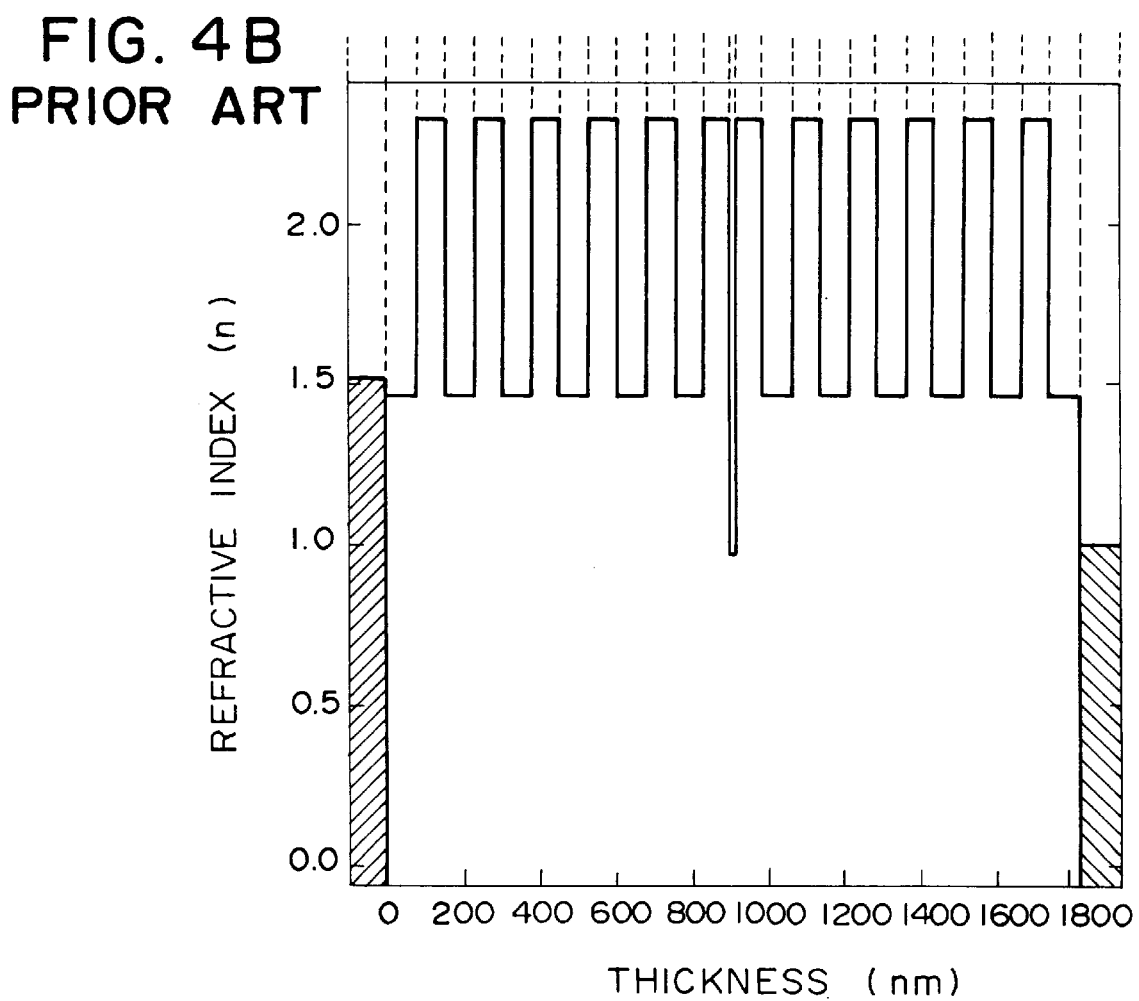
FIG. 4B shows a thickness and a refractive index of each layer in the configuration show in FIG. 4A.
Figure 5:
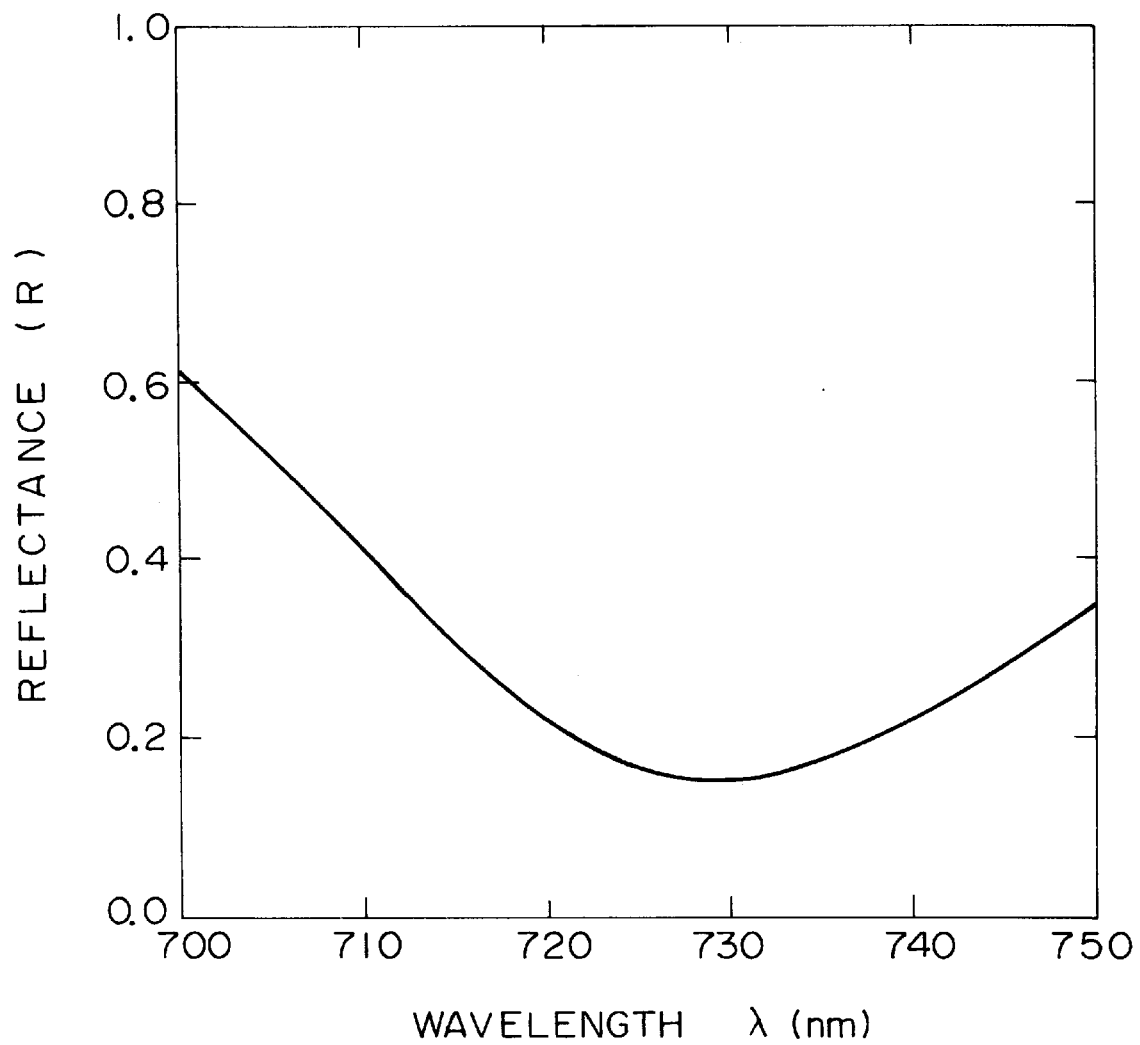
FIG. 5 is a graph which shows reflectance characteristics of the optical filter shown in FIG. 4A.
Figure 6:
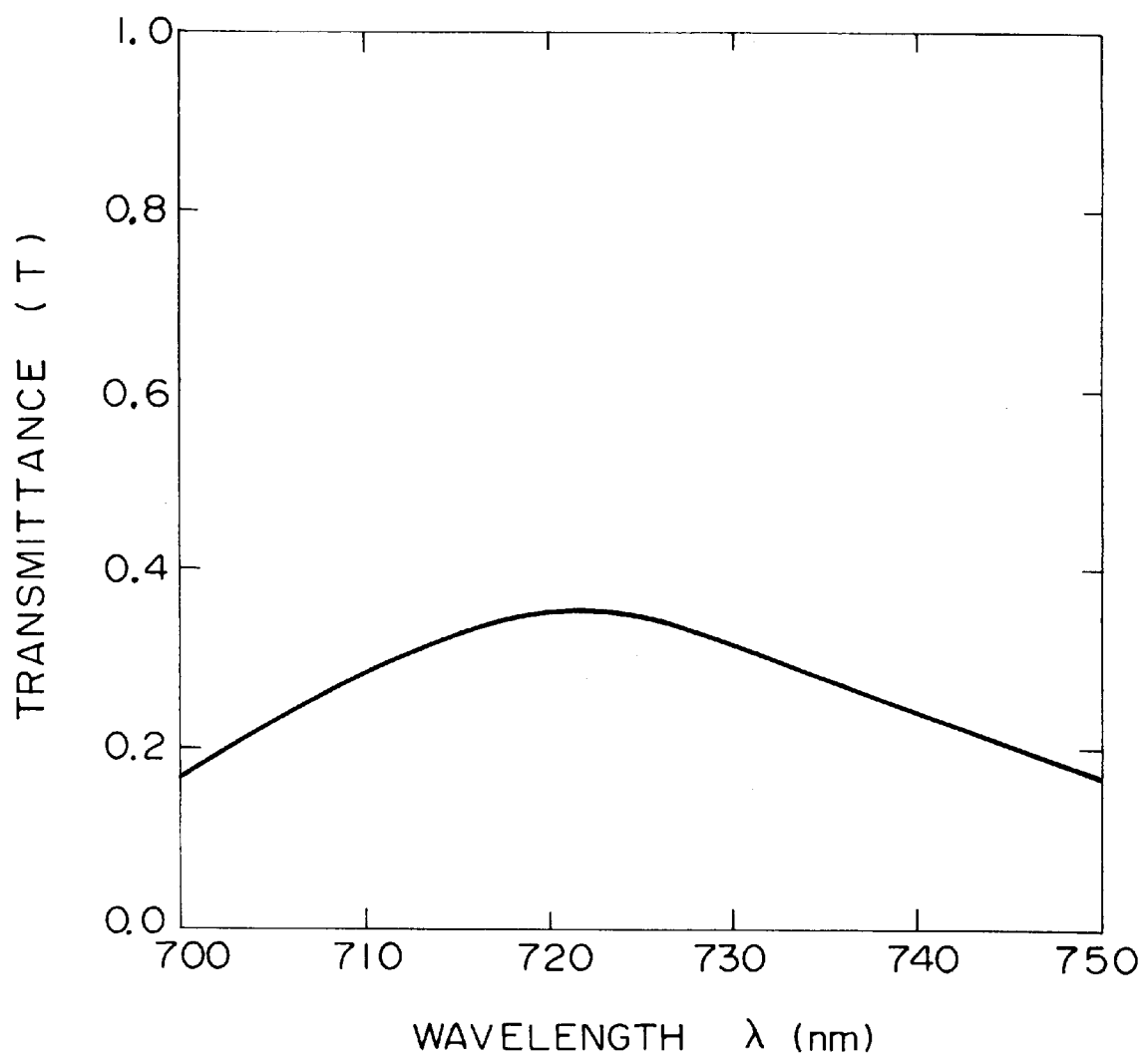
FIG. 6 is a graph which shows transmittance characteristics of the optical filter shown in FIG. 4A.

Referring to FIG. 3, five optical filters having third SiO$_2$ layers 4 with the following thicknesses t are formed:

$$t = \lambda/40 \approx 20 \text{ nm}$$
$$= \lambda/50 \approx 15 \text{ nm}$$
$$= \lambda/80 \approx 10 \text{ nm}$$
$$= \lambda/100 \approx 7 \text{ nm}$$
$$= \lambda/200 \approx 4 \text{ nm}$$

and the graph shows a reflectance R at a wavelength λ for each optical filter.

As shown in FIG. 3, a reflectance R of the filter with t=20 nm (=λ/40) has a minimum of approximately 1.8% at λ≈800 nm, and a reflectance R of approximately 2.4% can be achieved at a given λ=780 nm. As the thickness of the third SiO$_2$ layer 4 decreases, the reflectance R decreases and k for the minimum reflectance decreases. In the optical filter with t=4 nm (=λ/200), the reflectance R has a minimum of 0% at a given λ=780 nm.

It is presumed that the above results are obtained because a SiO$_2$ layer 4 with a low refractive index (n≈1.45) is deposited adjacent to an Al layer 3, in which the SiO$_2$ layer 4 is thinner than the Al layer 3. Also, when the given λ has a different value, a predetermined transmittance and a low reflectance may be achieved by depositing a dielectric thin-film, such as a SiO$_2$ layer 4, having a thickness t less than λ/40, being thinner than a metal film and having a low refractive index n, adjacent to a metal film, such as an AL layer 3, having a high refractive index n. Further, an air layer with a refractive index (n=1.0) may be provided in place of the substrate 2.

As described above, in accordance with this invention, a predetermined transmittance and a low reflectance can be achieved by depositing a dielectric thin-film adjacent to a metal film, the dielectric thin-film having a thickness of λ/40 or less, which is smaller than that of the metal film, and a refractive index lower than that of the metal film.

What is claimed is:

1. An optical filter for absorbing a part of optical signals with a wavelength λ and restricting the intensity of the transmitted light, comprising: a substrate, a plurality of sets of high index layers with a high refractive index and low index layers with a low refractive index, and a metal layer, said high index layers and said low index layers being alternately deposited on said substrate, said metal layer being provided between one high index layer and the adjacent low index layer among said plurality of sets of high index layers and low index layers, said low index layer adjacent to said metal layer having a thickness no greater than λ/40.

2. An optical filter according to claim 1, wherein said high index layers comprise TiO$_2$, said low index layers comprise SiO$_2$, and said metal layers comprise Al.

* * * * *